United States Patent
Hayford et al.

(10) Patent No.: US 6,502,671 B2
(45) Date of Patent: Jan. 7, 2003

(54) BRAKE ACTUATION USING A TOGGLE CLAMP

(75) Inventors: Roy Lee Hayford, Redford, MI (US); Neil Williams, Henllys (GB); Juergen Dreher, Muelheim-Kaerlich (DE); Christos T Kyrtsos, Southfield, MI (US); Wilfred Giering, Mendig (DE); Gerald D. Anderson, Oxford, MI (US); David Brademeyer, Centerville, OH (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/764,684

(22) Filed: Jan. 18, 2001

(65) Prior Publication Data

US 2002/0092716 A1 Jul. 18, 2002

(51) Int. Cl.$^7$ .......................... F16D 55/08; F16D 55/16
(52) U.S. Cl. ........................ 188/72.7; 74/110; 74/520
(58) Field of Search .................... 188/72.7, 72.8, 188/72.9; 74/110, 106, 520

(56) References Cited

U.S. PATENT DOCUMENTS

| | | | |
|---|---|---|---|
| 1,453,356 A | 5/1923 | House, Jr. | |
| 1,753,362 A | 4/1930 | Clapp | |
| 1,850,652 A | 3/1932 | Beatty | |
| 2,153,280 A | 4/1939 | Shelor | |
| 2,953,221 A | 9/1960 | Lucien | |
| 3,137,368 A | 6/1964 | Press et al. | |
| 3,318,420 A | 5/1967 | Adams | |
| 3,780,833 A | 12/1973 | Sundermann | |
| 3,796,287 A | * 3/1974 | Kolm | 188/112 |
| 3,986,584 A | * 10/1976 | Wright et al. | 188/71.8 |
| 4,042,073 A | 8/1977 | Dickenson | |
| 4,121,697 A | 10/1978 | Kobelt et al. | |
| 4,290,507 A | * 9/1981 | Brown | 188/24.15 |
| 4,592,451 A | 6/1986 | Persson | |
| 4,809,823 A | * 3/1989 | Fargier | 188/72.7 |
| 4,842,102 A | 6/1989 | Tateyama et al. | |
| 4,969,539 A | 11/1990 | Ishibashi | |
| 5,131,511 A | 7/1992 | Appleberry | |
| 5,249,648 A | * 10/1993 | Bejot et al. | 188/72.7 |
| 5,479,838 A | * 1/1996 | Yoshizawa | 74/834 |
| 5,649,454 A | * 7/1997 | Midha et al. | 74/520 |
| 6,302,029 B1 | * 10/2001 | Distelrath | 188/185 |

* cited by examiner

Primary Examiner—Christopher P. Schwartz
Assistant Examiner—Devon Kramer
(74) Attorney, Agent, or Firm—Carlson, Gaskey & Olds

(57) ABSTRACT

The braking mechanism comprises a toggle lever, a brake pad, and an incline. An incline actuates the braking mechanism by forcing an extension of the toggle lever. As the toggle lever extends, it pushes the brake pad closer to the surface to be slowed. Multiple toggle levers may be used to distribute the force across the brake pad. This configuration allows a single input from the incline to actuate both toggle levers. By adjusting the width of the incline actuating the toggle lever, the force on the brake pad may be adjusted.

17 Claims, 2 Drawing Sheets

BRAKE ACTUATION USING A TOGGLE CLAMP

BACKGROUND OF THE INVENTION

This invention relates to a braking mechanism using a toggle lever for a vehicle such as a truck or automobile.

Brakes for vehicles typically include some actuating mechanism that moves a cam, piston, or other device in an actuation direction for predetermined distance. This mechanism then moves a brake pad toward a surface to be slowed. This movement directly in the actuation direction of the brake pad requires that the actuation mechanism have sufficient force and ability to travel through a sufficient distance that it can apply supply sufficient movement to the brake pad and sufficient force.

There are limits on the available space, and it would be desirable to limit the amount of force required from the actuation mechanism. Thus, various braking mechanisms have been proposed which have force and distance movement multipliers. One proposed mechanism utilizes a toggle lever, including two arms connected at a central pivot point to a driving piston. This connection to the driving piston then results in the piston selectively being extended or retracted to drive the piston between retracted and extended positions. This arrangement is unduly complex, and the direct connection between the actuation mechanism and the two lever arms is undesirable. Moreover, the actuation movement is generally perpendicular to the resulting actuation direction movement of the brake pad, which is also undesirable.

SUMMARY OF THE INVENTION

In a disclosed embodiment of this invention, the braking mechanism comprises a toggle lever, a brake pad, and an incline. The toggle lever has two pivotally connected arms. An incline actuates the braking mechanism by forcing the extension of the toggle lever. During the extension, the two arms pivot to move the brake pad into contact. The incline for actuating the braking mechanism may be a wedge, a cam, or a curved surface moving in the direction of the brake pad. The incline is not fixed to the arms but is movable along a contact roller. Thus, there can be some adjustment due to the lack of direct connection. Moreover, it is preferred that the actuation direction is movable in the direction of the brake pad actuation movement.

One arm of the toggle lever is pivotally and operatively connected to a support for rotation about an axis. The two arms of the toggle lever are bent at an angle in relationship to each other when the lever is not actuated. The second arm of the toggle lever is operatively connected to a guide for translational movement in the direction of the brake pad. As the incline moves, it extends the toggle lever to an unbent position, pushing the brake pad closer to the surface to be slowed. A roller is used to improve the contact between the incline and toggle lever. The toggle lever multiplies the actuating force imparted by the wedge. By adjusting the width of the incline, the multiplying effect is also adjusted.

Another embodiment of the invention is the use of multiple toggle levers with a single incline. Multiple toggle levers operatively connect to a brake pad, permitting a single input from an incline to actuate all levers, greatly reducing the complexity of current braking mechanisms. The multiplying effect of all toggle levers is adjusted by the adjustment of the single incline. This single adjustment allows the braking mechanism to meet varying braking needs. No significant redesign of the braking mechanism is thereby required.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
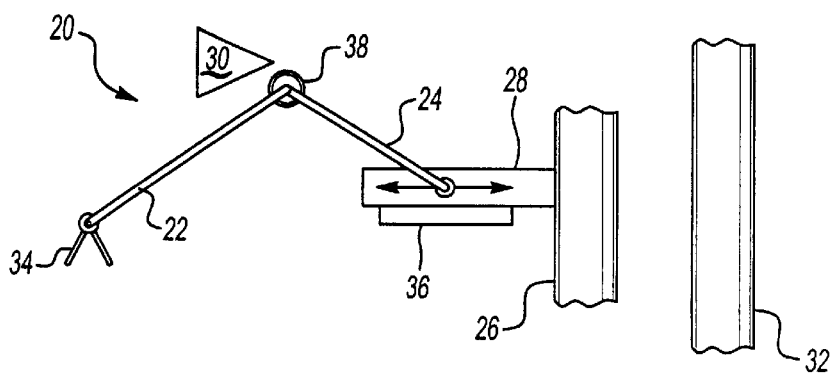
FIG. 1 shows an embodiment of the present invention, including toggle lever, break pad, and incline.
Figure 5:
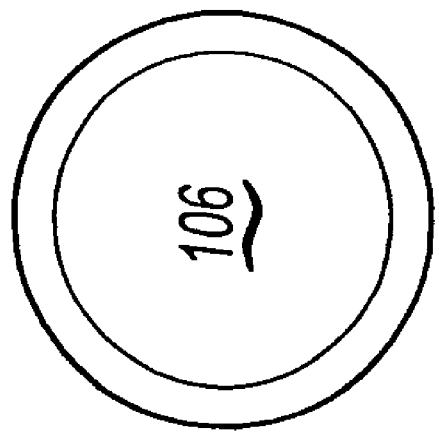
FIG. 5 shows a cam.
Figure 4:
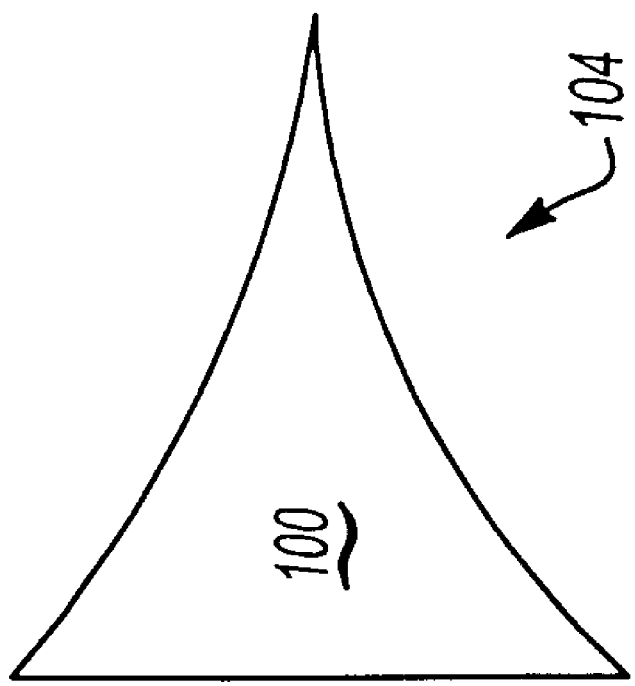
FIG. 4 shows a curve.

FIG. 1 illustrates a schematic representation of the present invention. Toggle lever 20 has first arm 22 and second arm 24, which is pivotally connected to brake pad 26 through rod 28 or other object known in the prior art. First arm 22 and second arm 24 are pivotally and operatively connected at a roller 38. Lever 20 is shown in a bent non-actuated position in this figure. Incline 30 actuates toggle lever by moving in the direction of brake pad 26 and extending toggle lever 20. Incline 30 is illustrated here as a wedge, although other forms, such as a cam 100 (See FIG. 4) or curve 106 (see FIG. 5), may accomplish the same function. Some mechanism such as a piston, or mechanical connection, drives incline 30 to the right from the FIG. 1 position. When an operator wishes to actuate the brake, the mechanism drives the incline to the right from this position. During this movement toggle lever 20 is forced to the FIG. 2 position, moving brake pad 26 toward disc 32. First arm 22 of toggle lever 20 is pivotally and operatively connected to support 34 to allow its extension. Second arm 24 and rod 28 are restricted in movement by guide 36 to control movement of second arm 24 and rod 28 in the direction of brake pad 26. Roller 38 contacts incline 30 to ease movement of incline 30 across toggle lever 20. The components are shown somewhat schematically, and a worker in the art would recognize how to build an appropriate braking mechanism.

Figure 2:
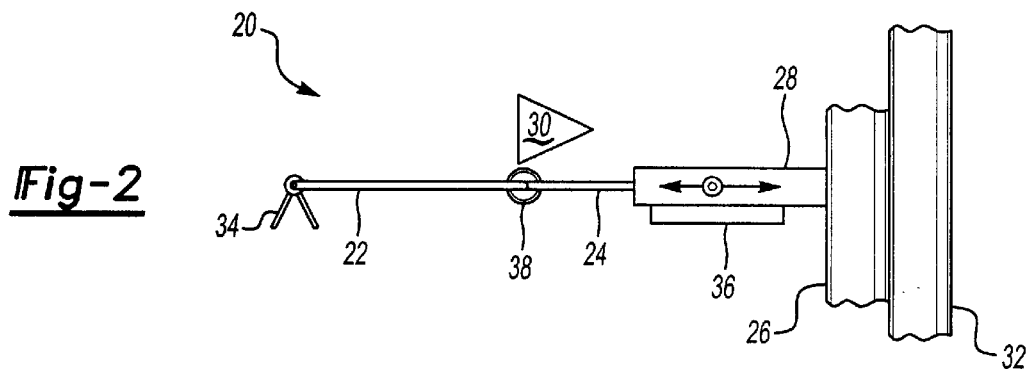
FIG. 2 shows the embodiment of FIG. 1 in an actuated and extending position.

FIG. 2 illustrates the embodiment of FIG. 1 with toggle lever 20 fully actuated and extended. Incline 30 has passed over roller 38, pivoting first arm 22 and second arm 24 into an extended position. Because first arm 22 is pivotally and operatively connected to support 34 and the remote end of second arm 24 attached to rod 28 is fixed in translational movement in the direction of brake pad 26 by guide 36, the actuation of the braking mechanism pushes rod 28 and brake pad 26 towards disc 32 to slow movement of the vehicle wheel, not pictured. By adjusting the width or slope of incline 30, the force on brake pad 26 by toggle lever 20 may also be adjusted. The force on brake pad 26 increases as the slope of incline 30 decreases. The force decreases as the slope of incline 30 increases.

Figure 3:
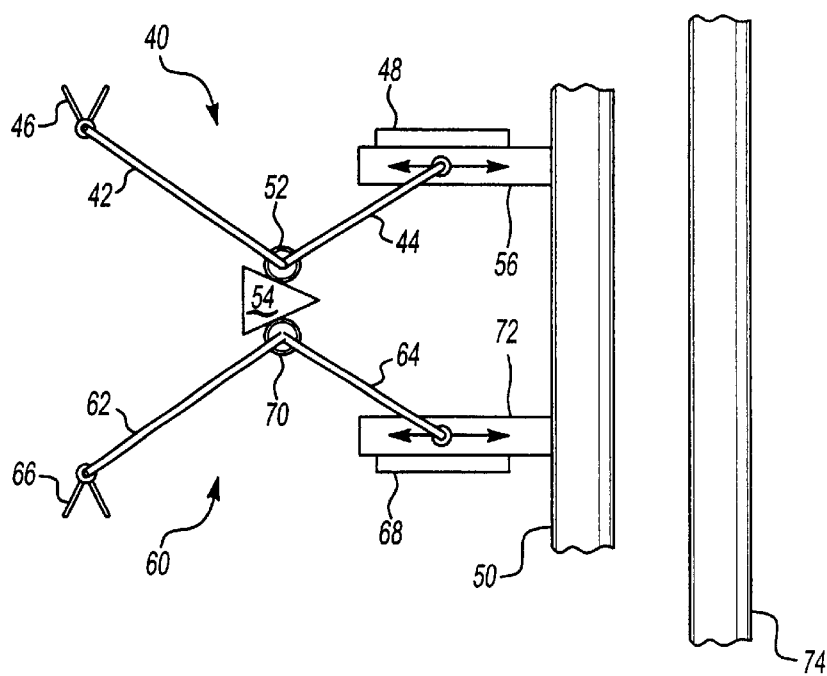
FIG. 3 shows another embodiment of the present invention using a single wedge to actuate two toggle levers against a single brake pad.

FIG. 3 illustrates another embodiment of the present invention. Toggle lever 40 has first arm 42 and second arm 44. First arm 42 of toggle lever 40 is pivotally and operatively connected to support 46 to allow lever's 40 extension. First arm 42 is pivotally and operatively connected to second arm 44 at roller 52. Second arm 44 has an end attached to rod 56, which is restricted in movement by guide 48 to control movement parallel to an actuation in the direction of brake pad 50. A roller 52 is in contact with incline 54 to ease movement of incline 54 across toggle lever 40.

An opposed toggle lever 60 has first arm 62 and second arm 64, pivotally and operatively connected. First arm 62 of toggle lever 60 is pivotally and operatively connected to support 66 to allow its extension. Second arm 64 is connected to rod 72 and restricted in movement by guide 68 to control movement parallel to an actuation in the direction of brake pad 50. A roller 70 is in contact with incline 54 and toggle lever 60 to ease movement of incline 54 across toggle lever 60.

In this embodiment, both toggle levers 40 and 60 are actuated simultaneously by a single input, incline 54, to move rods 56 and 72 and brake pad 50 towards disc 74. Moreover, the input is distributed evenly across brake pad 50. While this embodiment shows two toggle levers 40 and 60, three, four, or any number of toggle levers are useful to distribute force across a single brake pad 50 and accordingly disc 74. As described above, the width of incline 54 alters the force on brake pad 50 and disc 74. By changing incline 54, the force of the braking mechanism is thereby adjusted.

In a sense, the embodiments provide a mechanical advantage in both distance traveled and braking force delivered. The toggle arms provide a lever effect to increase the delivered force. The toggle effect results in multiplication of movement. That is, a given amount of movement of the incline results in an increased amount of movement of the brake pad due to the toggle connection. Thus, a smaller lower force actuator can be used.

In the above embodiments, the inclines are not fixed to the roller but move relative to the rollers. This feature allows for self-adjustment. Moreover, this movement of the incline is in the actuation direction of the brake pad, which is preferable to the prior art. While the inclines are disclosed in contact at the pivot point, it is possible for the incline to be in contact at location other then the pivot point, such as a point on an arm of the toggle lever.

The aforementioned description is exemplary rather then limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. A braking mechanism for a vehicle comprising:
   a toggle lever with a first arm pivotally and operatively connected to a second arm and pivotally moveable between a retracted position and an actuated position;
   a brake pad connected to be driven by said toggle lever between said retracted and said actuated positions; and
   an incline operatively in contact with said toggle lever to drive said toggle lever between said retracted and actuated positions but being movable relative to said toggle lever, wherein said incline is driven to move in an actuation direction of said brake pad.

2. A braking mechanism as set forth in claim 1, wherein said incline is a wedge.

3. A braking mechanism as set forth in claim 1, wherein said incline is a cam.

4. A braking mechanism as set forth in claim 1, wherein said incline is a curve.

5. A braking mechanism as set forth in claim 1, wherein said first arm is pivotally and operatively connected to a support for rotation about an axis.

6. A braking mechanism for a vehicle comprising:
   a toggle lever with a first arm pivotally and operatively connected to a second arm and pivotally moveable between a retracted position and an actuated position;
   a brake pad connected to be driven by said toggle lever between said retracted and said actuated positions; and
   an incline operatively in contact with said toggle lever to drive said toggle lever between said retracted and actuated positions but being moveable relative to said toggle lever, wherein said second arm is connected to a rod which is moveable in an actuation of said brake pad as said second arm pivots between said retracted and actuated position.

7. A braking mechanism as set forth in claim 6, wherein a guide limits movement of said rod and an end of said second arm connected to said rod to move in said actuation direction of said brake pad.

8. A braking mechanism as set forth in claim 1, including a roller providing a pivotal connection between said arms and in contact with said incline.

9. A braking mechanism for a vehicle comprising;
   at least two toggle levers with first arms pivotally and operatively connected to second arms and pivotally moveable between a retracted position and an actuated position;
   a brake pad connected to be driven cooperatively by both of said toggle levers between a retracted and an actuated position; and
   an incline operatively in contact with said toggle levers to drive said toggle levers between said retracted and actuated positions but being movable relative to said toggle levers.

10. A braking mechanism as set forth in claim 9, wherein said incline is a wedge.

11. A braking mechanism as set forth in claim 9, wherein said incline is a cam.

12. A braking mechanism as set forth in claim 9, wherein said incline is a curve.

13. A braking mechanism as set forth in claim 9, wherein said incline is driven to move in an actuation direction of said brake pad.

14. A braking mechanism as set forth in claim 9, wherein at least one of said first arms is pivotally and operatively connected to a support for rotation about an axis.

15. A braking mechanism as set forth in claim 9, wherein at least one of said second arms is connected to a rod which is moveable in an actuation of said brake pad as said second arm pivots between said retracted and actuated position.

16. A braking mechanism as set forth in claim 15, wherein at least one guide limits movement of at least one of said rods and an end of at least one of said second arm connected to said rod to move in said actuation direction of said brake pad.

17. A braking mechanism as set forth in claim 9, including at least one roller in communication with at least one of said toggle levers and said incline.

* * * * *